United States Patent
Helwa et al.

(10) Patent No.: US 11,852,714 B2
(45) Date of Patent: Dec. 26, 2023

(54) STATIONARY STATUS RESOLUTION SYSTEM

(71) Applicant: THALES CANADA INC., Toronto (CA)

(72) Inventors: Mohamed Helwa, Toronto (CA); Mohammad Sharif Siddiqui, Toronto (CA); Veronica Marin, Toronto (CA)

(73) Assignee: THALES CANADA INC., Toronto (CA)

(*) Notice: Subject to any disclaimer, the term of this patent is extended or adjusted under 35 U.S.C. 154(b) by 430 days.

(21) Appl. No.: 17/116,589

(22) Filed: Dec. 9, 2020

(65) Prior Publication Data

US 2021/0173071 A1  Jun. 10, 2021

Related U.S. Application Data

(60) Provisional application No. 62/945,670, filed on Dec. 9, 2019.

(51) Int. Cl.
*G01S 13/52* (2006.01)
*G01S 13/931* (2020.01)

(52) U.S. Cl.
CPC ............ *G01S 13/52* (2013.01); *G01S 13/931* (2013.01); *G01S 2013/93271* (2020.01)

(58) Field of Classification Search
CPC ............... G01S 13/931; G01S 13/60; G01S 2013/93271; G01S 7/4091; G01S 7/415;

(Continued)

(56) References Cited

U.S. PATENT DOCUMENTS

| 4,414,548 | A | | 11/1983 | Carpenter et al. |
| 4,684,950 | A | * | 8/1987 | Long ............... G01S 13/524 342/159 |

(Continued)

FOREIGN PATENT DOCUMENTS

| DE | 44 11 029 B4 | 3/2004 |
| EP | 2 548 784 A2 | 1/2013 |

(Continued)

OTHER PUBLICATIONS

Chellaswamy et al., "Optimized vehicle acceleration measurement for rail track condition monitoring", Sep. 1, 2017; pp. 1-7; https://www.researchgate.net/publication/318329356_Optimized_vehicle_acceleration_measurement_for_rail_track_condition_monitoring.

(Continued)

*Primary Examiner* — Olumide Ajibade Akonai
(74) *Attorney, Agent, or Firm* — HAUPTMAN HAM, LLP

(57) ABSTRACT

In some embodiments, a non-transitory computer-readable storage medium includes instructions to identify, based upon Doppler-speed determination from one or more radars, radar targets within a hitbox for determining a first stationary status of a vehicle based on tracking Doppler-speed radar targets in a hitbox region. The medium also includes instructions to identify, based upon the Doppler speed determination from the one or more radars, field-of-view (FOV) radar targets for determining a second stationary status based on a substantial number and a distribution of Doppler-speed determinations for the FOV radar targets. The medium also includes instructions to confirm, based on detecting a change in either of the first or the second stationary status of the vehicle, an acceleration sensed by an inertial measurement unit onboard the vehicle.

20 Claims, 10 Drawing Sheets

(58) Field of Classification Search
CPC .................. G01S 13/726; G01S 13/87; G01S 2013/93274; G01S 2013/93273; G01S 13/52; G01S 13/50; G01S 13/582; G01S 13/93; G01S 13/524; G01S 13/5248; G01S 2013/93185; G01S 2013/9319; G01S 2013/9321; G01S 7/2923; G01S 13/584; G01S 2013/93272; G01S 2013/9325; G01S 2013/9328; G01S 13/88; G01S 2013/93275; G01S 13/32; G01S 13/56; G01S 13/42; G01S 13/04; G01S 7/414; G01S 17/86; G01S 13/5244; G01S 13/89; G05D 1/0257; G05D 1/0223; G05D 2201/0213; G05D 1/021; G05D 1/0289; B60W 2554/801; B60W 2554/4041; B60W 30/12; B60W 30/143; B60W 2754/30; B60W 2420/52; B60W 2720/10; B60K 31/0008; G08G 1/16
See application file for complete search history.

(56) References Cited

U.S. PATENT DOCUMENTS

| | | | | |
|---|---|---|---|---|
| 5,907,568 | A * | 5/1999 | Reitan, Jr. | ........... G01S 7/22 342/26 B |
| 8,296,065 | B2 | 10/2012 | Haynie et al. | |
| 9,229,102 | B1 * | 1/2016 | Wright | ........... G01S 13/885 |
| 9,239,376 | B2 | 1/2016 | Mathews et al. | |
| 9,645,250 | B2 | 5/2017 | Zeng et al. | |
| 10,222,471 | B2 | 3/2019 | Cao et al. | |
| 10,297,153 | B2 | 5/2019 | Gao et al. | |
| 10,401,490 | B2 | 9/2019 | Gillian et al. | |
| 10,514,456 | B2 | 12/2019 | Niesen | |
| 2018/0087907 | A1 | 3/2018 | Debitetto et al. | |
| 2019/0049572 | A1 | 2/2019 | Hong et al. | |
| 2019/0094877 | A1 * | 3/2019 | Smith | ........... G05D 1/0246 |
| 2019/0196478 | A1 | 6/2019 | Mocheria et al. | |
| 2019/0391250 | A1 | 12/2019 | Cohen et al. | |
| 2021/0018609 | A1 * | 1/2021 | Zhu | ........... G01S 13/48 |

FOREIGN PATENT DOCUMENTS

| | | |
|---|---|---|
| JP | 5619632 B2 | 11/2014 |
| WO | 2015/014638 A1 | 2/2015 |
| WO | 2018/063245 A1 | 4/2018 |
| WO | 2019/200178 A1 | 10/2019 |

OTHER PUBLICATIONS

Kellner, et al., "Tracking of Extended Objects with High-Resolution Doppler Radar", Dec. 1, 2015; pp. 1-14; https://www.researchgate.net/publication/287218012_Tracking_of_Extended_Objects_with_High-Resolution_Doppler_Radar.

* cited by examiner

STATIONARY STATUS RESOLUTION SYSTEM

RELATED APPLICATIONS

The following application claims priority to U.S. provisional patent application No. 62/945,670 filed on Dec. 9, 2019, and is hereby incorporated by reference in its entirety.

BACKGROUND

The positioning and speed of a rail vehicle can be determined by a system comprised of a checked-redundant vehicle onboard controller (VOBC) computer connected to a set of sensors. The sensors can consist of a radio frequency identification (RFID) tag reader, a tachometer/speed sensor, camera, event camera, LIDAR, UWB technology, radar and accelerometer with RFID tags installed along the guideway. Speed and positioning functions are typically part of the VOBC.

VOBC systems are expensive both in sensor cost and manpower through installing the necessary equipment to have the VOBC system operate efficiently. A large number of sensors are difficult to install and maintain. In some communications based train control (CBTC) systems, it is difficult to install the traditional speed sensors or tachometers on the vehicles. Hall Effect sensors and tachometers are commonly installed on a bogie and the installation is constrained by maintenance pit scheduling and is time and labor intensive. Further, Hall Effect sensors and tachometers are prone to providing incorrect speed data during wheel slippage on the bogie. Each of these sensors must be maintained periodically and this adds to the cost. Some sensors of a VOBC system are also affected by environmental conditions to which a vehicle is exposed on a regular basis. Other sensors require off vehicle equipment to be installed on the guideway and are expensive.

BRIEF DESCRIPTION OF THE DRAWINGS

Aspects of the present disclosure are best understood from the following detailed description when read with the accompanying FIGS. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
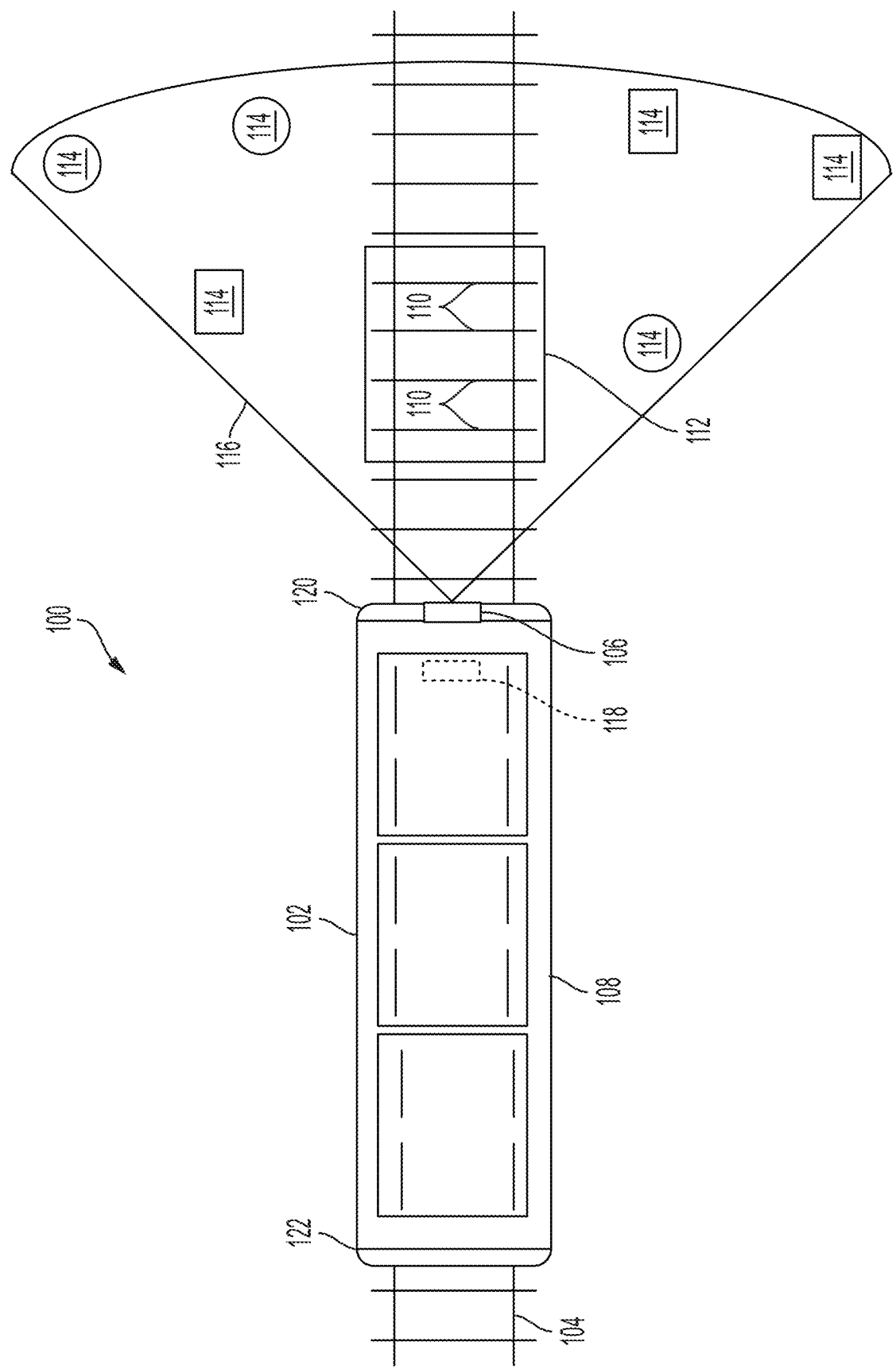
FIG. 1 is a top-level diagram of a stationary status resolution system (SSRS), in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features are formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus may be otherwise oriented (e.g., rotated 90 degrees or at other orientations) and the spatially relative descriptors used herein may likewise be interpreted accordingly.

In some embodiments, a stationary status resolution system (SSRS) is based on tracking zero-Doppler-speed radar measurements (e.g., detecting zero speed for radar detected targets using the Doppler Effect) and detecting acceleration changes (e.g., through an inertial measurement unit (IMU)/accelerometer) to support stationary resolution determinations. In some embodiments, an SSRS has one or more radars and one or more IMU/accelerometers for the resolution of the stationary status (e.g., stationary/non-stationary) of vehicles in a rail environment (e.g., a guideway).

In some embodiments, a SSRS provides for a cost-effective solution for determining stationary status of vehicles that is (1) easier for personnel to install and maintain, (2) unaffected by vehicle wheel slipping/spinning, (3) independent of integrating speed/acceleration, (4) less likely to be affected by various environmental conditions such as weather and illumination effects, and (5) independent of equipment installed on the guideway.

In some embodiments, commercial off the shelf (COTS) radars and IMUs determine the stationary status of the vehicle. Additionally or alternatively, radar Doppler speed and range measurements to reflective objects in the surrounding landscape and supported by acceleration measurements from the IMU determine the stationary status. In some embodiments, a SSRS determines stationary status by estimating whether the vehicle speed or travelled distance is zero using the relative observations measured in a reference frame of the radar (hereinafter mentions to the reference frame or radar frame are made to a vehicle mounted radar frame), and by detecting motion transition (i.e., acceleration) using IMU measurements. Additionally or alternatively, the radar is the sensor technology for indicating the stationary status of vehicles while the IMU determines a stationary state transition (e.g., a stationary state to a non-stationary state or a non-stationary state to a stationary state) based on a measured motion profile. The radar-based indication and the IMU-based motion detection are then combined and monitored over a time period in order to provide a final stationary status output.

FIG. 1 is a top-level diagram of a stationary status resolution system (SSRS) 100, in accordance with some embodiments. In some embodiments, SSRS 100 is configured for a vehicle 102 for use on a guideway 104. One or more radars 106 are operably coupled to a body 108 of vehicle 102. One or more processors (602 FIG. 6) are operably coupled to radars 106. Memory (604 FIG. 6) is operably coupled to processor (602) and is configured to store executable instructions (606 FIG. 6), such as a stationary resolution algorithm (FIGS. 4A, 4B, 5A, 5B, 5C and 5D), that when executed by processor (602), cause processor (602) to: determine a plurality of hitbox targets 110 located within a hitbox 112 (i.e., a predetermined area in front of vehicle 102) that have zero-Doppler speed and constant range based upon returned radar signals; determine a plurality of field of view (FOV) targets 114 located outside of hitbox 112 in a FOV 116 that have zero-Doppler-speed based upon the returned radar signals; and determine vehicle 102 is stationary when hitbox targets 110 and FOV targets 114 have the zero-Doppler speed and constant range based upon the returned radar signals.

In some embodiments, vehicle 100 is a train having a series of connected vehicles that generally run along a railroad (e.g., guideway or railway) track to transport passengers or cargo (also known as "freight" or "goods"). In some embodiments, vehicle 100 is any vehicle that transports people or cargo. Vehicles include wagons, bicycles, motor vehicles (e.g., motorcycles, cars, trucks, and buses), watercraft (e.g., ships, boats), amphibious vehicles (e.g., screw-propelled vehicle, hovercraft), aircraft (e.g., airplanes, helicopters), spacecraft or the like.

In some embodiments, guideway 104 provides both physical support, like a road, as well as the guidance. In the case of fixed-route systems, the two are often the same in the same way that a rail line provides both support and guidance for a train. In some embodiments, systems use smaller wheels riding on the guideway to steer the vehicle using conventional steering arrangements like those on a car. In some embodiments, a track has two running rails with a fixed spacing that is supplemented by additional rails such as electric conducting rails (e.g., a third rail) and rack rails. In some embodiments, monorails and maglev guideways are used.

In some embodiments, radar 106 is a detection system that uses radio waves to determine the range, angle, or velocity (i.e., speed) of objects. Radar is used to detect all types of objects, such as aircraft, ships, spacecraft, guided missiles, motor vehicles, weather formations, and terrain. A radar system has a transmitter producing electromagnetic waves in the radio or microwaves domain, a transmitting antenna, a receiving antenna (often the same antenna is used for transmitting and receiving) and a receiver and processor to determine properties of the object(s). Radio waves (e.g., pulsed or continuous) from the transmitter reflect off the object and return to the receiver, giving information about the object's location and speed. In some embodiments, radar 106 is a COTS radar. In some embodiments, radar 106 has a processor to determine detected object properties, such as range, azimuth and Doppler speed. In some embodiments, processor (602) performs range detection, azimuth determination and Doppler speed based on radar return data.

In some embodiments, hitbox targets 110 are reflective objects on the ground (e.g., rail ties and rail baseplates) that are tracked as targets with radar 106 to determine when vehicle 102 is stationary. As hitbox 112 is covering guideway 104 for a short distance from vehicle 102, hitbox 112 has a very low probability of having moving targets. In some embodiments, if vehicle 102 is stationary, all reflections from stationary ground objects in hitbox 112 will be stationary in the radar frame, and consequently, are observed and tracked as zero-Doppler speed hitbox targets 110. In some embodiments, if vehicle 102 is moving, then all the reflections from hitbox targets 110 will be non-stationary with respect to the moving radar (i.e., coupled to a moving vehicle), and consequently, is not tracked as zero-Doppler-speed (e.g., as radar 106 will report them as having speed) targets in hitbox 112. Additionally or alternatively, a verification in tracking zero-Doppler-speed targets in the form of monitoring constant range to these targets verifies that hitbox targets 110 are stationary with respect to the radar frame.

In some embodiments, hitbox 112 is a space located in front of vehicle 102 a predetermined area away from vehicle 102. Additionally or alternatively, hitbox 112 is an invisible shape, such as a type of bounding box coupled to the vehicle. In some embodiments, hitbox 112 is a rectangle or cuboid (e.g., 3D) that is attached to and follows a point on vehicle 102. That is, in some embodiments, hitbox 112 remains the same shape, size and distance away from vehicle 102 regardless of what vehicle 102 is doing. In some embodiments, hitbox 112 is circular or spheroidal shape.

In some embodiments, FOV targets 114 are reflective objects, outside of hitbox 112, that are tracked as targets with radar 106 to determine when vehicle 102 is stationary. In some embodiments, FOV targets 114 are stationary objects spatially distributed in the entire radar FOV 116 (e.g., rail baseplates, pillars, trees, nearby wayside infrastructure, and walls in platforms and in the tunnel). In some embodiments, FOV targets 114 include all radar targets inside the radar FOV inside and outside hitbox 112, thus including hitbox targets 110. FOV targets 114 provide a significantly larger population of targets in comparison to hitbox targets 110, including those produced by the surrounding infrastructure that is often stationary. In some embodiments, if vehicle 102, equipped with radar 106, is stationary, then any infrastructure in FOV 116 will be observed as zero-Doppler-speed targets. Examples include radar targets originated from rail ties, rail baseplates, pillars, trees, rocks, and walls, among others. In some embodiments, if vehicle 102 is non-stationary, then it's extremely unlikely that a large number of targets distributed over the FOV 116 of radar 106 move in complete synchronization with vehicle 102 (e.g., same speed and direction), so that FOV targets 114 are all stationary in the radar frame (i.e., the FOV 116) and have zero-Doppler-speed. In some embodiments, a stationary resolution algorithm contains a FOV processing algorithm (FIG. 4B) for determining a vehicle's stationary status from the probability that processor (602) will be able to discriminate whether vehicle 102 is stationary or not from a statistically-significant population of zero-Doppler-speed targets distributed over FOV 116.

In some embodiments, FOV 116 is the extent of the observable world that is seen at any given moment by radar 106. In some embodiments, such as the case of radar 106 the FOV is a solid angle through which a radar is sensitive to microwave radiation.

In some embodiments, radar 106 and IMU 118 are mounted at a first end 120 of vehicle 102. In some embodiments radar 106 and/or IMU 118 are mounted at a second end 122 of vehicle 102. In some embodiments, a radar 106 is mounted to both first end 120 and second end 122 (see FIG. 2). Additionally or alternatively, radar 106 is mounted on vehicle body 108, and typically measures range, azimuth angle, and Doppler speed of targets 110, 114 (e.g., detected reflections from targets 110, 114). In some embodiments, IMU 118 is installed close to the train bogie and provides inertial acceleration measurements of train body 108 instead of providing direct measurements of the train speed. In some embodiments, the acceleration transition is correlated with the detection of motion transition that is used to identify state changes in the stationary status.

In one embodiment, a first stage of a stationary resolution algorithm uses the fact that guideway 104 in front vehicle 102 (e.g., hitbox 112) contains reflective objects on the ground (e.g., rail ties and rail baseplates) that are tracked as hitbox targets 110 with zero-Doppler-speed when vehicle 102 is stationary. Additionally or alternatively, as hitbox 112 is covering only guideway 104 for a short distance from vehicle 102, hitbox 112 has a very low probability of having moving targets (e.g., things that move tend not to get in front of vehicle 102; especially a large vehicle like a train). In some embodiments, if vehicle 102 is stationary, all reflections from hitbox targets 110 in hitbox 112 will be stationary in hitbox 112, and consequently, are observed and tracked as zero-Doppler-speed targets. In some embodiments, if vehicle 102 is moving, then all the reflections from hitbox targets 110 will be non-stationary with respect to radar 106, and consequently, do not produce zero-Doppler-speed data. In some embodiments, in tracking zero-Doppler-speed targets in hitbox 112, extra checks are implemented, such as a range verification to verify that hitbox targets 110 are stationary with respect to hitbox 112. In some embodiments, this extra check is used as there are low speeds that Doppler speed data has difficulty detecting.

In one embodiment, a second stage of a stationary resolution algorithm detects FOV targets 114 from stationary objects spatially distributed in FOV 116 (e.g., rail baseplates, pillars, trees, nearby wayside infrastructure, and walls in platforms and in the tunnel). In some embodiments, hitbox targets 110 are also considered FOV targets 114 as hitbox targets 110 are also within FOV 116. However, in some embodiments, unlike hitbox 112, FOV 116 does not have the advantage of detecting hitbox targets 110 from the ground. In some embodiments, the FOV stage of the stationary resolution algorithm brings the advantage of providing a significantly larger population of FOV targets 114, including those produced by the surrounding infrastructure that is stationary. In some embodiments, if vehicle 102 is stationary, then any infrastructure in FOV 116 will be observed as zero-Doppler-speed targets. Examples include FOV targets 114 originated from rail ties, rail baseplates, pillars, trees, rocks, and walls, and the like. In some embodiments, if vehicle 102 is non-stationary, then it's unlikely that a large number of FOV targets 114 distributed over FOV 116 move in complete synchronization with vehicle 102, so that FOV targets 114 appear stationary in FOV 116 and have zero-Doppler-speed. Hence, the FOV stage of the stationary resolution algorithm is determined from discriminating whether vehicle 102 is stationary or not based on a statistically-significant population of FOV targets 114 with speed behavior that is substantially alike.

In some embodiments, to account for the relativity of radar measurements, a large number of FOV targets 116 are tracked as the probability of all FOV targets 114 moving all at once is extremely small and thus vehicle 102 has a high probability of moving. Thus, if only a small number of FOV targets 114 have changing or non-zero-Doppler-speed, then an FOV processing algorithm (e.g., a sub algorithm of the stationary resolution algorithm) will determine these FOV targets 114 are moving and not vehicle 102 as the majority of FOV targets 114 remain stationary. As is discussed in greater detail below, and in some embodiments, this FOV stationary determination will then be verified against the hitbox stationary determination of the first stage (an hitbox processing algorithm (FIG. 4A) e.g., a sub algorithm of the stationary resolution algorithm) and verified over time in a fifth stage (FIG. 5C, a combined stationary algorithm e.g., a sub algorithm of the stationary resolution algorithm).

In some embodiments, both the hitbox processing algorithm and the FOV processing algorithm are expected to operate properly and output a correct stationary status indication in normal operation. In some embodiments where one of the hitbox processing algorithm or the FOV processing algorithm does not have enough data for indicating a stationary status, the other algorithm still provides a stationary resolution status. For example, if the hitbox processing algorithm does not have enough data for indicating a hitbox stationary status because hitbox targets 110 in hitbox 112 are blocked by humans crossing guideway 104 in hitbox 112 or hitbox targets 110 are not being reported as radar 106 is absorbed with high Radar Cross-Section (RCS) objects (e.g., other, possible larger objects, are drowning out the radar signatures of hitbox targets 110) in the vicinity of hitbox 112, then FOV processing algorithm is used for the stationary status determination. In some embodiments, the FOV processing algorithm does not have enough targets 114 in FOV 116 to define a reliable statistical determination because of adverse weather conditions such as thick ice on a radar face and thus hitbox processing algorithm is used to make the stationary status determination. Thus, having two independent stages (i.e., algorithms) of the stationary resolution algorithm for indicating stationary status increases the probability of a clear and accurate stationary resolution.

In some embodiments, IMU 118 is used to detect and verify transitions in the stationary status of the vehicle (e.g., from stationary to non-stationary and vice versa), and is crosschecked with the changes in the stationary status outputs of both the hitbox stage and the FOV stage. Additionally or alternatively, IMU 118 detects transitions in the stationary status by correlating these transitions to particular changes in the longitudinal acceleration (e.g., aligned with the motion) of vehicle 102. In some embodiments, a longitudinal acceleration algorithm (FIG. 5B) (i.e., a sub-algorithm of the stationary resolution algorithm) includes a change in acceleration and is unconcerned with vehicle speed as this provides incorrect stationary status at times due to bias errors. In some embodiments, IMU 118 is a COTS IMU and that measures and reports a body's specific force, angular rate, and sometimes the orientation of vehicle 102, using a combination of accelerometers, gyroscopes, and sometimes magnetometers.

In some embodiments, in a fifth stage (i.e., a combined stationary algorithm FIG. 5C) of the stationary resolution algorithm false status indications are prevented by monitoring a stationary or non-stationary status indication for the hitbox processing algorithm, the FOV processing algorithm, a longitudinal acceleration algorithm and a drift supervision algorithm to be consistently repeated over a prescribed period of time to generate a final stationary status. The final status is not dependent on an instantaneous stationary indication but on a series of stationary indications during a time period. In some embodiments, the time period is 400 ms to determine a stationary status and 200-300 ms for determining a non-stationary status. Additionally or alternatively, more time is provided to determine a stationary status as it is a safe state and some safety-related operations (e.g., train door opening) follow.

In some embodiments, vehicle 102 has a radar 106 and an IMU 118; however, in some embodiments, SSRS 100 has a radar 106 without an IMU 118. However, in some embodiments, for greater safety integrity, SSRS 100 is implemented with two or more radars as well as a diverse sensor technology (e.g., two COTS IMUs or accelerometers). These embodiments are discussed in reference to the FIGS below.

Figure 2:
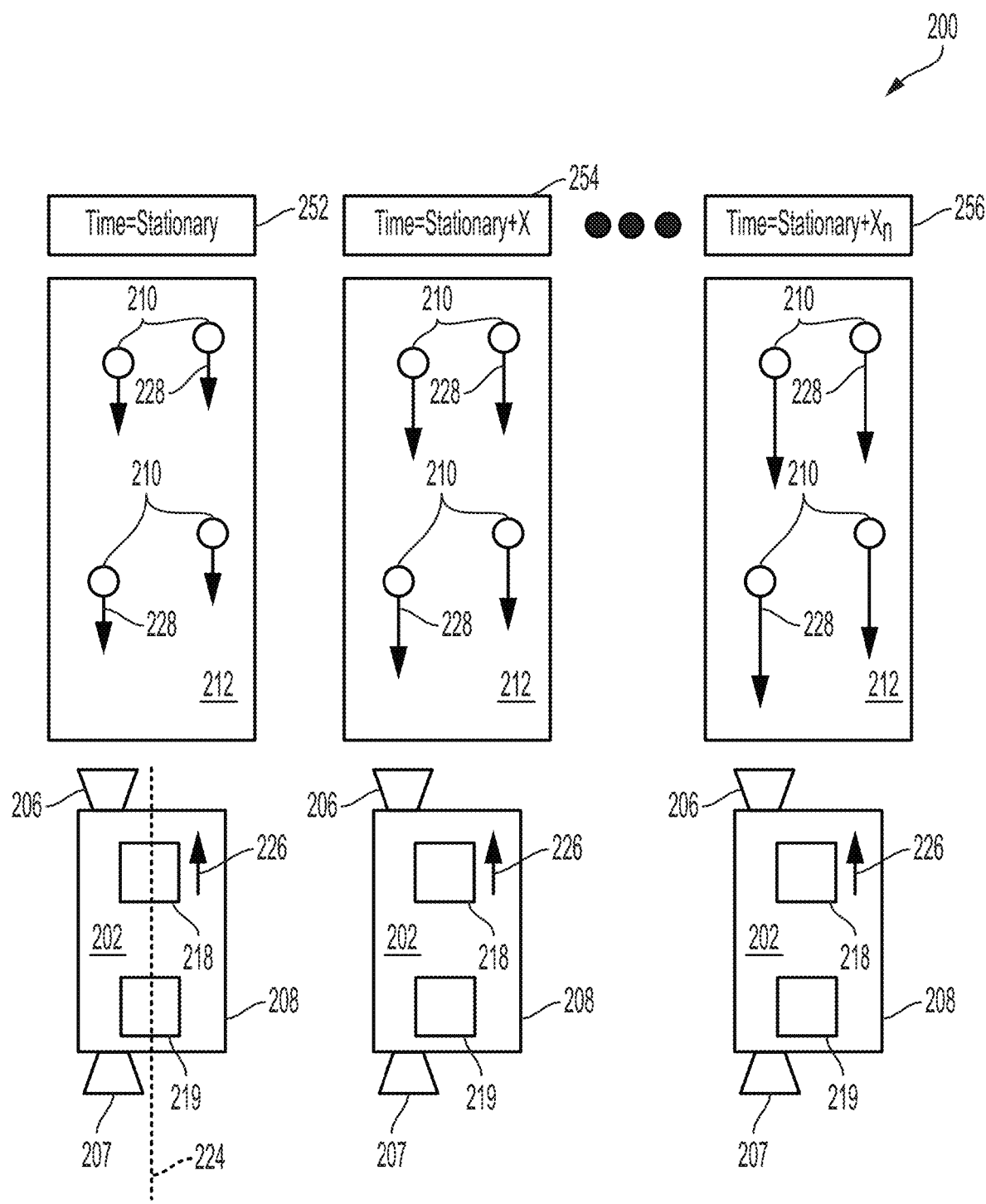
FIG. 2 is a high-level functional block diagram of an SSRS, in accordance with some embodiments.

FIG. 2 is a high-level functional block diagram of an SSRS 200, in accordance with some embodiments. In some embodiments, a non-transitory computer-readable storage medium (604) contains executable instructions, such as stationary resolution algorithm that, when executed by processor (602), cause processor (602) to: identify, based upon Doppler-speed determination from one or more radars 206, 207, radar targets 210 within a hitbox 212 for determining a first stationary status of a vehicle 202 based on tracking Doppler-speed radar targets 210 in a hitbox region 212; identify, based upon the Doppler speed determination from radars 206, 207, FOV radar targets (not shown) located outside of hitbox 212 for determining a second stationary status based on a substantial number and a distribution of Doppler-speed determinations for FOV radar targets (not shown); and confirm, based on detecting an acceleration sensed by IMUs 218, 219 onboard vehicle 202, a change in either of the first or the second stationary status of vehicle 202.

In some embodiments, SSRS 200 with vehicle 202 equipped with radars 206, 207 and IMUs 218, 219 is like SSRS 100 with vehicle 100 equipped with radar 106 and IMU 118. In some embodiments, SSRS 200, for greater safety integrity, implements two or more radars 206, 207 and has two COTS IMUs 218, 219. In some embodiments, two radars are mounted on vehicle body 208 at the same end of vehicle 202 and two associated IMUs. In some embodiments, two radars are located at each end of the train and two associated IMUs as shown in FIG. 2. In some embodiments, four radars, two at each end of the vehicle and four associated IMUs/accelerometers are used for safety redundancy and spatial diversity.

In some embodiments, one or more radars are installed on most any location on train body 208. In some embodiments, one or more radars are located on the exterior of train body 208 and not underneath vehicle 202 to reduce installation and maintenance costs of the radars. Additionally or alternatively, the one or more radars are located where tracking/observing zero-Doppler-speed targets (e.g., targets that are stationary in the radar frame) provides the largest FOV. In some embodiments, IMUs 218, 219 are installed such that the longitudinal axis of IMUs 218, 219 is aligned with a vehicle primary axis 224 of motion and IMUs 218, 219 are located close to the train bogie center point to reduce errors in lever arm calculation. In some embodiments, the bogie acceleration is the actual train acceleration, whereas an IMU mounted away from the bogie, such as at the front of the train, will detect an extra component. Additionally or alternatively, this is because the front of the train doesn't follow the guideway in a similar manner to the bogie. For example, the top of a large truck wobbles more than the bottom and can be accounted for if the height (e.g., the lever arm) of the truck is known.

Figure 3A:
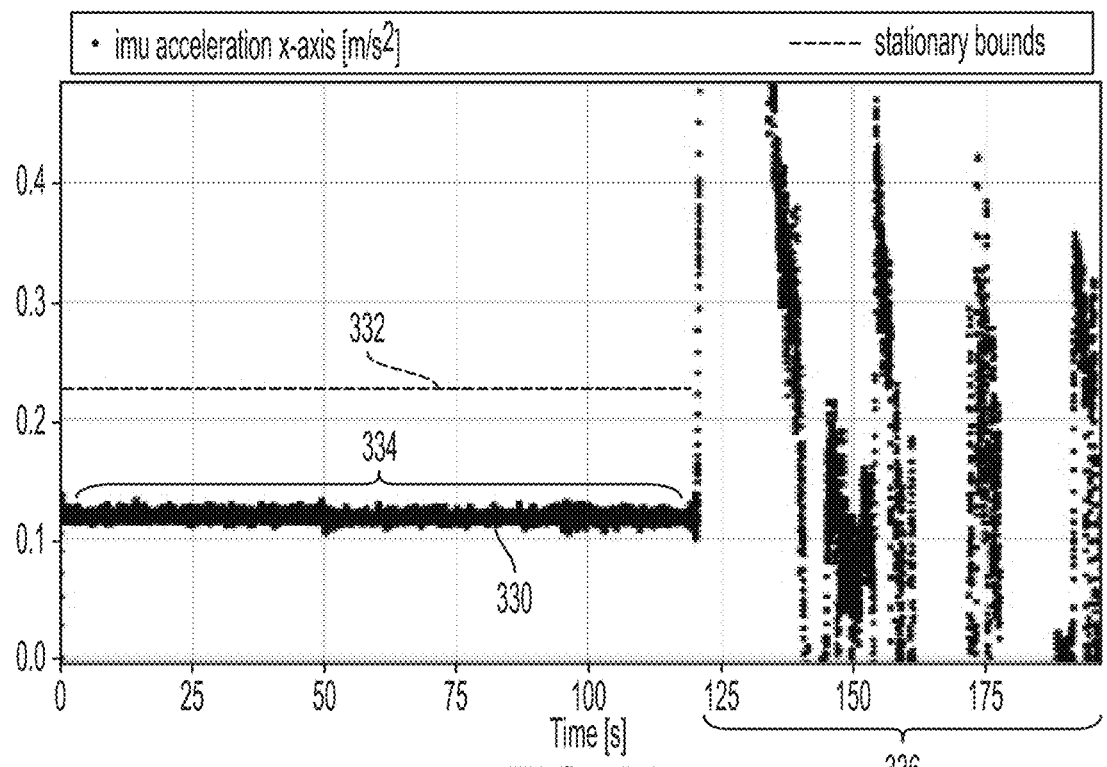
FIG. 3A is a graphical representation of longitudinal acceleration data during a stationary to non-stationary status transition, in accordance with some embodiments.
Figure 3B:
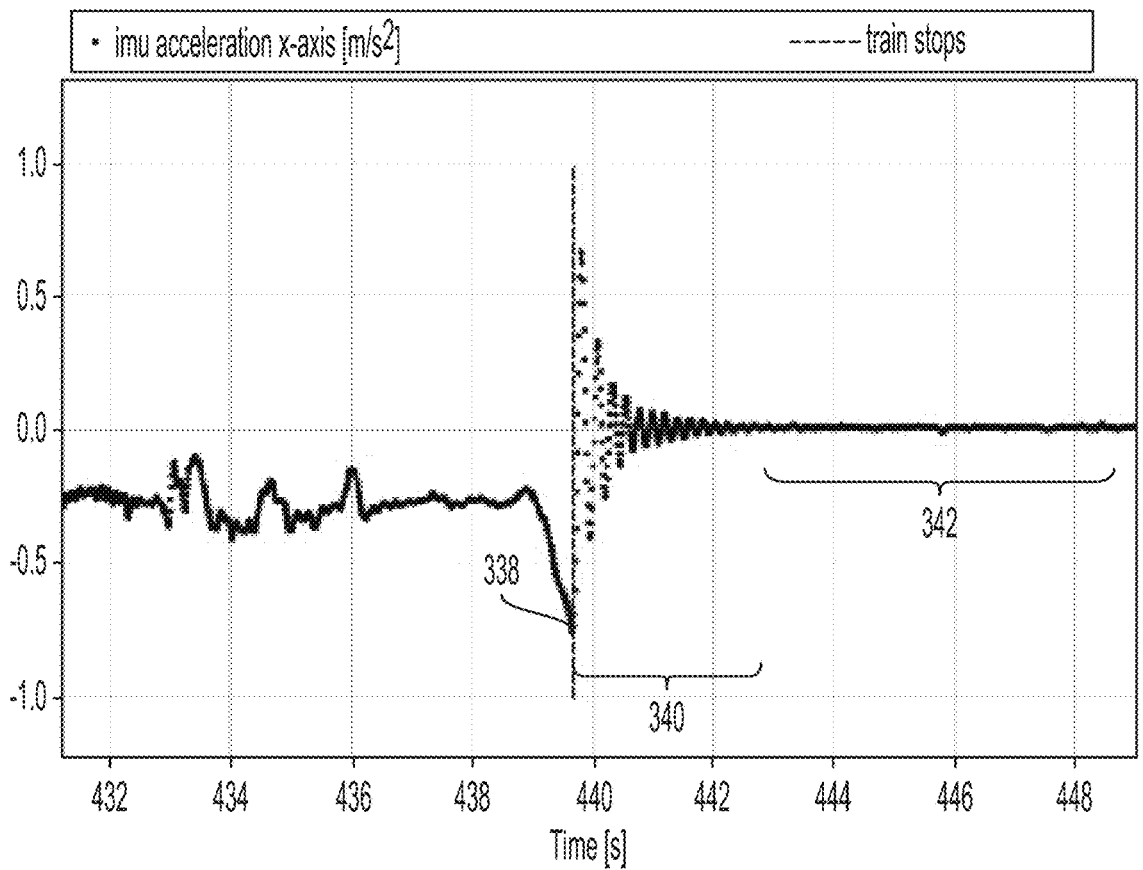
FIG. 3B is a graphical representation of longitudinal acceleration data during a non-stationary to stationary status transition, in accordance with some embodiments.

In some embodiments, a first stage is a hitbox processing algorithm (FIG. 4A) and based on tracking zero-Doppler-speed radar targets 210 in hitbox region 212. In some embodiments, a second stage is a FOV processing algorithm (FIG. 4B) and based on checking the number and distribution of zero-Doppler-speed targets in the FOV of radars 206, 207. In some embodiments, a third stage is a drift supervision algorithm (FIG. 5A) for detection of very slow vehicle drift, represented by arrow 226, over time (e.g., time progression is represented by arrow 250 moving from left to right), of vehicle 202 with speeds lower than the numerical speed resolution of the radar. In some embodiments, a fourth stage is a longitudinal acceleration algorithm (FIG. 5B) that indicates changes in the status of vehicle 202 by correlating them to changes in the longitudinal acceleration of the vehicle using IMUs 218, 219 (FIGS. 3A & 3B). In some embodiments, a fifth stage is a combined stationary algorithm (FIG. 5C) where false status indications are eliminated by monitoring a stationary or non-stationary status indication to be consistently repeated over a prescribed period of time to generate a final stationary status. In some embodiments, a sixth stage is a unified stationary algorithm (FIG. 5D) that combines a combined stationary status decision of redundant devices (e.g., multiple radar and multiple IMUs) for outputting a unified stationary status decision for all radars and IMUs. Additionally or alternatively, stages one through six do not need to be performed in a specific order. In some embodiments, each stage is performed independently of the other stages. In some embodiments, while each of stage one through six complements the other, each stage determines its own stationary or non-stationary output. Additionally or alternatively, the terms first, second, third, fourth, fifth and sixth stages are used for descriptive purposes for the order of presentation and are not limiting as to an order of necessary process.

In some embodiments, a drift supervision algorithm is used to detect slow drift, arrow 226, of vehicle 202. In some embodiments, a magnitude of slow drift 226, is represented by arrows 228 extending from hitbox targets 210. Additionally or alternatively, magnitude 228 of slow drift 226 is measured by changes in the positions of tracked zero-Doppler-speed targets 210 within hitbox 212 over a time period. In some embodiments, magnitude 228 of slow drift 226 is continuously monitored as long as vehicle 202 is stationary and it is carried out in blocks of time (e.g., check whether the change in position of tracked targets in hitbox region over the last 5 seconds indicate that all targets drift together in one direction more than 20 cm; if yes, indicate drift, then repeat this check as long as the vehicle stationary status is stationary). In some embodiments, the hitbox processing algorithm (FIG. 4A) and the FOV processing algorithm (FIG. 4B) of the stationary resolution algorithm are complemented by the drift supervision algorithm for determining slow drift 226 of vehicle 202 during speeds lower than a numerical speed resolution of radar 206. In some embodiments, the radar provides speed as multiples of its numerical speed resolution/numerical granularity. Additionally or alternatively, the radar differs based on the radar manufacturer/type (e.g., a 0.25 m/s for one brand and 6.25 cm/s for another). Nevertheless, in some embodiments, when a train drifts with 2 cm/s on a very shallow grade, then speed of radar targets will be zero due to the numerical resolution/granularity of radar device while over time the monitoring/tracking of position of tracked targets indicates that slow drift is happening. In some embodiments, at very low speeds, the reported Doppler speed of stationary ground targets 210 will be zero due to the numerical speed resolution of radar 206 and consequently, very slow movement of vehicle 202 is not detected by observing the Doppler speed. Hence, in some embodiments, a slow drift 226 of vehicle 202 is observed by changes in the positions of tracked zero-Doppler-speed hitbox targets 210 in hitbox 212 over a time period (e.g., starting the time period once a stationary status is established ([time=stationary] 252), moving through ([time=stationary+X] 254), and then, flags the case when tracked targets 210 all drift in one direction with magnitude 228 higher than a prescribed threshold (e.g., 20 cm) (time=stationary+$X_n$ where the time period 256 ends and a change of status to non-stationary is issued from the drift supervision algorithm).

Figure 4A:
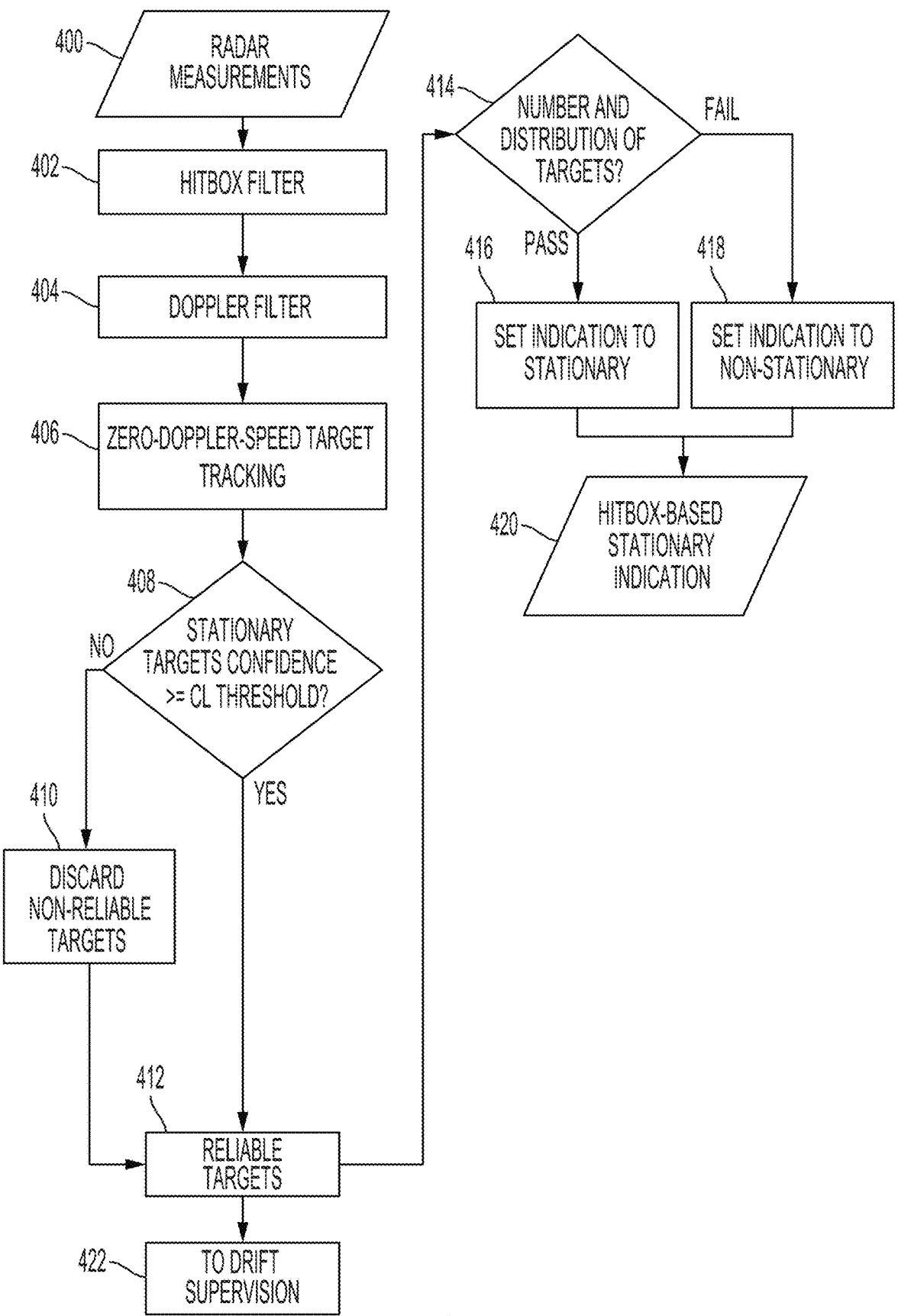
FIG. 4A is a high-level flow diagram of a hitbox processing algorithm, in accordance with some embodiments.
Figure 4B:
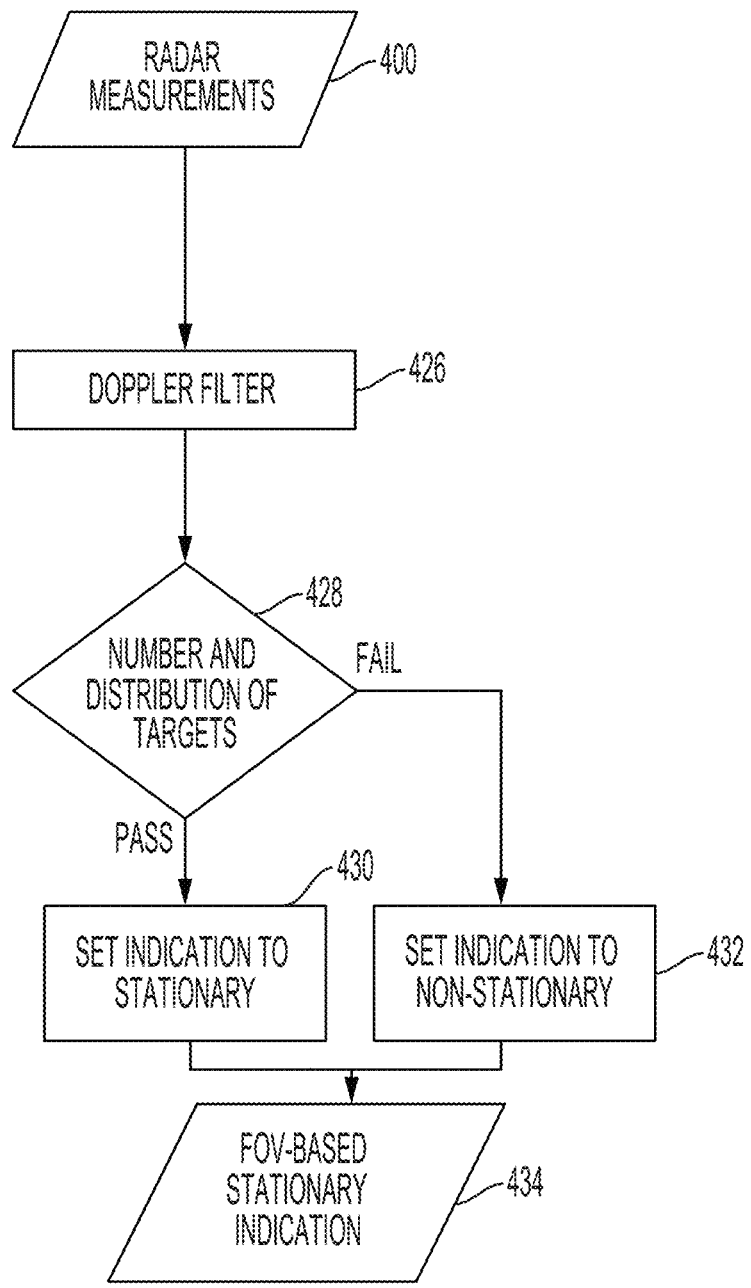
FIG. 4B is a high-level flow diagram of a field of view (FOV) processing algorithm, in accordance with some embodiments.

In some embodiments, drift supervisor algorithm is a complement to first stage hitbox processing algorithm (FIG. 4A) and second stage FOV processing algorithm (FIG. 4B). In some embodiments, another complement to hitbox processing algorithm and FOV processing algorithm is through detection of longitudinal acceleration by IMUs 218, 219 in the below discussed fourth stage of a stationary resolution algorithm.

FIGS. 3A and 3B are graphical representations of longitudinal data during a stationary to non-stationary and non-stationary to stationary status transitions, in accordance with some embodiments. In some embodiments, a longitudinal acceleration algorithm (FIG. 5B) receives an initial stationary status from the hitbox processing algorithm and/or FOV processing algorithm. Additionally or alternatively, after initialization, longitudinal acceleration algorithm relies on the previous stationary status history (e.g., its internal history in longitudinal acceleration algorithm) not on the radar-based stationary status as this will make the two algorithms radar-based and an IMU-based, more Independent which is better for safety. Additionally or alternatively, when a current received status is stationary, the status will remain at a stationary status within the longitudinal acceleration algorithm unless a change in longitudinal acceleration 330 (e.g., data from one or more IMU) of the vehicle is detected above a prescribed threshold 332 to indicate a change in the vehicle status from stationary to non-stationary. In some embodiments, the prescribed threshold is a tunable parameter that depends on the vehicle type and geography of application. The threshold will be higher if the vehicle is allowed to pitch, or shake, forwards and backwards and if the terrain is inclined/ bumpy as opposed to smooth. In some embodiments, prescribed threshold 332 is approximately 0.2 m/s$^2$. In some embodiments, acceleration points 334 indicate an initial jump in acceleration at time=0 that is due to start of the IMU data recording on the system. This initial jump is ignored as the system has to initialize before detecting transitions. In some embodiments, acceleration points 336 surpass prescribed threshold 332 as vehicle acceleration grows and the vehicle moves from a stationary to a non-stationary state. Additionally or alternatively, the longitudinal acceleration algorithm issues a non-stationary status once acceleration points 336 surpass prescribed threshold 332 indicating the vehicle is moving.

In some embodiments, when the received status is non-stationary (i.e., received from the radar-based algorithms only during initialization and then the longitudinal algorithm takes over and determines its internal previous state of stationary or non-stationary) the longitudinal acceleration algorithm will set a stationary status when the acceleration algorithm receives an input from one or more IMUs indicating a change in the vehicle status. Additionally or alternatively, when a vehicle, such as a train, stops, a large negative decrease in acceleration, indicated by line 338 (FIG. 3B), is sensed by the IMU followed by underdamped oscillations, shown in acceleration points 340 in the longitudinal acceleration, and finally a bounded longitudinal acceleration shown in acceleration points 342. In some embodiments, the stopping behavior occurs as a force applied (e.g., the motor drive on the wheels) to the vehicle suddenly drops when the vehicle comes to a complete stop, resulting in a big jerk of the vehicle indicated at line 338. Additionally or alternatively, the change in the force causes energy to be stored in the suspension system and then dissipated causing the underdamped (decaying) oscillations 340 in the longitudinal acceleration. Finally, when the energy is almost fully dissipated, the longitudinal acceleration will converge to a bounded, almost-constant value 342.

In some embodiments, the one or more IMUs used to detect the transitions in the stationary status of the vehicle (from stationary to non-stationary or from non-stationary to stationary) are implemented to crosscheck any changes in the stationary status decisions of the hitbox processing algorithm and the FOV processing algorithm of the stationary resolution algorithm. In some embodiments, the one or more IMU used for detecting transitions in a stationary status correlate transitions to particular changes in the longitudinal acceleration (e.g., aligned with the motion) of the vehicle. Thus, in some embodiments, the one or more IMU are not integrated for calculating speed (i.e., that is inaccurate due to drift caused by bias error accumulation), but instead are used to determine an acceleration status.

In some embodiments, when a received status is non-stationary and the longitudinal acceleration algorithm identifies a large negative decrease in acceleration 338 the longitudinal acceleration algorithm outputs a status of non-stationary. Additionally or alternatively, a large negative decrease in acceleration 338 followed by underdamped oscillations 340 in the longitudinal acceleration, and finally a bounded longitudinal acceleration 342 is stopping behavior of the vehicle indicating a change in the vehicle stationary status from non-stationary to stationary.

As discussed, in some embodiments, the longitudinal acceleration algorithm is used as a cross check of the state transition determined from a tentative stationary decision of the hitbox processing algorithm or the FOV processing algorithm, discussed in greater detail below. Additionally or alternatively, to prevent false indications, a stationary indication has to be consistently repeated over a prescribed persistency period to generate a final stationary decision. The final decision does not depend on an instantaneous stationary indication but on a series of stationary indications during a persistency period.

In some embodiments, by determining the change in acceleration and not the value of acceleration itself, the stationary resolution algorithm removes the need for knowing the grade of the guideway at the current location of the vehicle. Additionally or alternatively, since the stationary resolution algorithm does not rely on integrating acceleration for calculating speed/position, the algorithm does not suffer from false indications of transitions due to accumulation of bias errors.

FIG. 4A is a high-level flow diagram of a hitbox processing algorithm, in accordance with some embodiments. In some embodiments, one or more radars receive radar returns from previous radar transmissions and begin to determine radar measurements, such as range, azimuth angle and Doppler speed (400) from targets providing a radar return. In some embodiments, the radar targets detected are then filtered (402), based on a range and an azimuth angle, to select the radar targets within a hitbox. For instance, a hitbox filter is applied on the range and azimuth angle of radar targets to select targets originating from the hitbox.

Additionally or alternatively, the selected radar targets within the hitbox are filtered even further to select the radar targets within the hitbox that have a substantially zero-Doppler-speed (404). For instance, another filter is applied to the hitbox targets to consider only targets with (e.g., substantially) zero-Doppler-speed within the hitbox region. In some embodiments, the threshold of the Doppler filter is selected to account for the possible Doppler speed error of stationary physical targets when the vehicle is stationary.

In some embodiments, if the vehicle is stationary, then targets from physical objects on the ground of the hitbox, e.g., rail baseplates and rail ties, will have zero-Doppler-speed. A tracker then tracks those targets in the hitbox region. In some embodiments, when the vehicle is non-stationary, then all radar targets originating from physical stationary objects on the ground of the hitbox will be moving with respect to the radar (i.e., also moving) and will have non-zero Doppler speed, and consequently radar targets will be filtered out either as they leave the hitbox (402) or by the Doppler filter (404). Additionally or alternatively, the Doppler filter considers only targets within the hitbox with (approximately) zero-Doppler-speed. With the Doppler filter, when there are moving targets in the hitbox, the moving targets are going to be filtered out and will not cause a false non-stationary hitbox indication as long as the moving targets do not considerably block the ground targets in the hitbox. In some embodiments, a tracker tracks the positions of zero-Doppler-speed targets to verify that the zero-Doppler-speed targets are constant within an acceptable tolerance as a check for verifying that these targets are originated from stationary objects with respect to the radar.

In some embodiments, the substantially zero-Doppler-speed radar targets are tracked to verify the positions of the substantially zero-Doppler-speed radar targets are constant (406). For instance, the positions of the zero Doppler speed targets within the hitbox are tracked to verify that the positions of the zero Doppler speed targets are constant within a tolerance that works as a second verification that these zero-Doppler-speed targets are stationary with respect to the radar. In some embodiments, tracking is carried out inside the radar device. For instance, the hitbox processing algorithm uses the target IDs provided by the radar when associating new radar measurements/targets to existing tracked targets and there is no need for implementing a full tracker by processor (602). Additionally or alternatively, the radar provides raw measurements and a full tracker is implemented to track the positions of zero Doppler speed targets. In some embodiments, any tracker is used to track the positions of zero Doppler speed targets.

In some embodiments, trackers carry out track management processes and provide the confidence level of each target. Additionally or alternatively, the confidence level is used to determine the confidence level of the stationary targets (408). Any low confidence targets are discarded ("NO" branch of block 408) (410). Higher confidence targets are considered reliably tracked targets ("YES" branch of block 408) (412).

In some embodiments, a number and distribution of the substantially zero-Doppler-speed radar targets is determined (414). Additionally or alternatively, checks on the number and distribution of reliably tracked targets inside the hitbox are carried out to indicate the stationary status. For instance, where the hitbox does not have moving objects in complete synchronization with the radar (e.g., same speed and direction), tracking many zero-Doppler-speed targets distributed in the hitbox region with high confidence is an indication that the considered vehicle is stationary ("PASS" branch of block 414) (416). In some embodiments, non-zero-Doppler speed targets are rejected from the beginning (e.g., Doppler filter 404). Additionally or alternatively, failure to track a number of zero-Doppler speed targets distributed in the hitbox with high confidence is an indication that the vehicle is non-stationary given that the hitbox has a low probability of having moving targets and thus the status is non-stationary ("FAIL" branch of block 414) (418).

In some embodiments, checking the number and distribution of reliably tracked zero-Doppler-speed targets within the hitbox reduces the probability of false stationary indications due to an object within the hitbox that moves in complete synchronization (e.g., same speed and direction) as the vehicle. In some embodiments, the number of reliably tracked zero-Doppler-speed targets within the hitbox will be higher than a prescribed threshold that is tuned based on field data. In some embodiments, the reliably tracked zero-Doppler-speed targets are distributed over the longitudinal extension of the hitbox and not all generated from almost the same longitudinal distance. That is the case of an obstacle vehicle within the hitbox that moves in the same direction and speed of the vehicle. However, since the hitbox region is only extended for a short longitudinal distance from the vehicle (e.g., 20 m), the scenario of an obstacle vehicle is a very unlikely scenario and in normal operation vehicles are not that close to each other for safety reasons.

In some embodiments, a hitbox based stationary indication is outputted as to whether the vehicle is stationary or non-stationery (420). With reference to block 412, once reliable targets are determined, these reliable targets are passed to the drift supervision algorithm (422) that is discussed in greater detail below in some embodiments.

FIG. 4B is a high-level flow diagram of a FOV processing algorithm, in accordance with some embodiments. In some embodiments, an FOV processing algorithm is implemented by applying a filter on the Doppler speed (426) of radar measurements (400) to consider only targets with (approximately) zero Doppler speed. Additionally or alternatively, the threshold of the Doppler filter is selected to account for the possible Doppler speed error of stationary physical targets when the vehicle is stationary.

In some embodiments, the number and distribution of the zero Doppler speed targets in the radar FOV are examined for indicating stationary status (428). For instance, when the algorithm finds a sufficient number of zero-Doppler-speed targets distributed in the radar FOV, then the algorithm will indicate that the vehicle is stationary ("PASS" branch of block 428) (430). However, when the algorithm finds a sufficient number of targets having Doppler speed distributed in the radar FOV, then the algorithm will indicate that the vehicle is non- stationary ("FAIL" branch of block 428) (432). The movement in complete synchronization (e.g., same speed and direction) of a large number of targets distributed over the FOV of the radar with the vehicle so that all targets are considered stationary with respect to the moving radar is extremely unlikely. In some embodiments, the distribution check (428) ranges from a simple distribution check on the longitudinal and lateral extensions of the zero Doppler speed targets in the radar FOV to involved statistical distribution checks. In some embodiments, the FOV stationary indication (434) is outputted and used in one or more other algorithms to provide a redundancy and prevent false stationary indications.

Figure 5A:
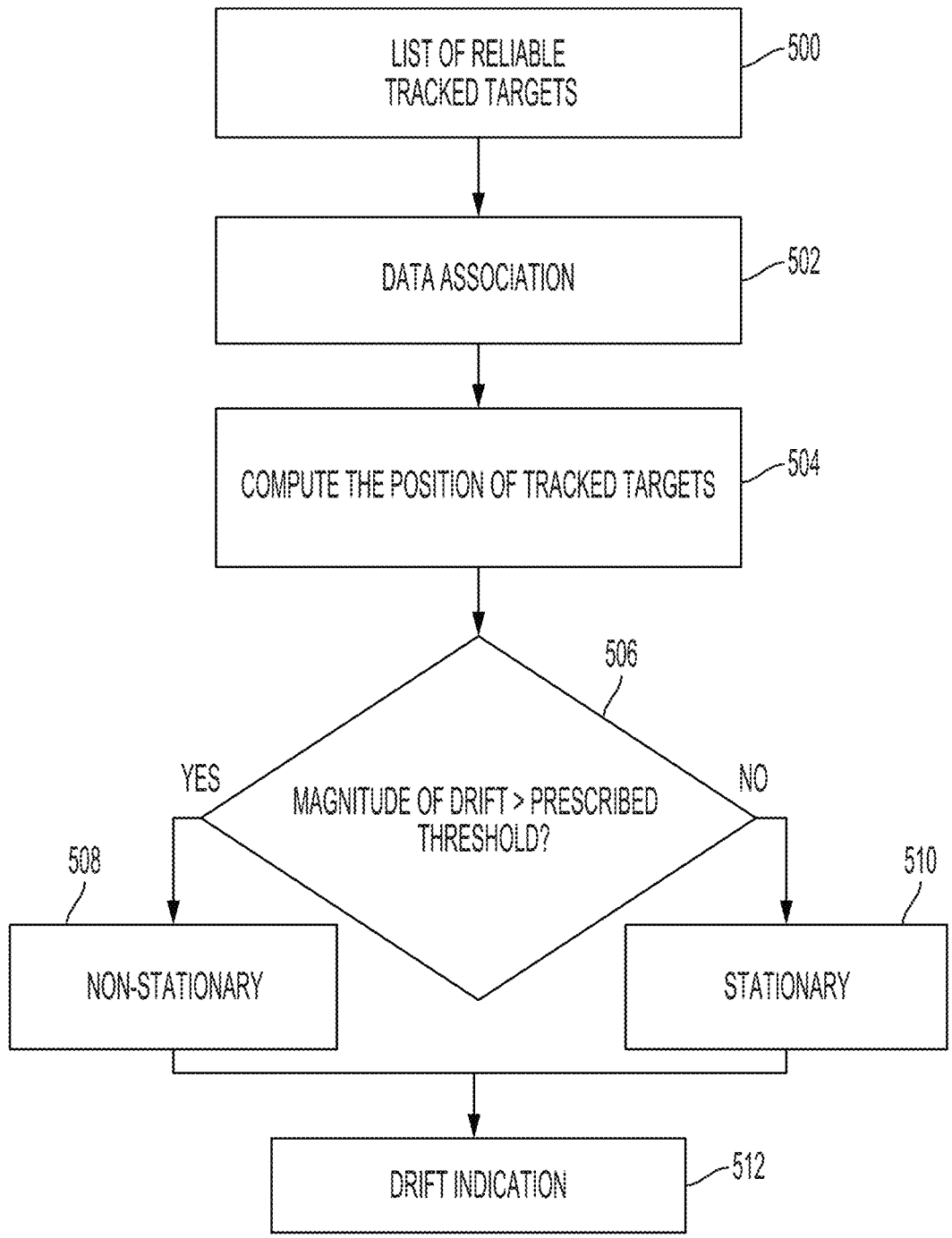
FIG. 5A is a high-level flow diagram of a drift detection algorithm, in accordance with some embodiments.

FIG. 5A is a high-level flow diagram of a drift detection algorithm, in accordance with some embodiments. In some embodiments, slow drift of the vehicle, drifting at speeds lower than the numerical speed resolution of the radar, are detected by observing changes in the positions of the tracked zero-Doppler-speed targets within the hitbox over a time period (e.g., starting once a stationary status is established), and then flagging the situation where these tracked targets drift in one direction more than a prescribed threshold (e.g., 20 cm).

In some embodiments, a list of reliable tracked targets is passed from the hitbox processing algorithm (FIG. 4A 422) to a drift supervision algorithm (500) to be used to detect slow drift of a vehicle. In some embodiments, the reliable tracked targets are data associated (502). That is new radar measurements have data associated to existing tracked points. In some embodiments, based upon the new radar measurements, a new position of the tracked targets is processed (504). Additionally or alternatively, a magnitude in change in position is determined and whether the change in position is greater than a prescribed threshold (506).

In some embodiments, a slow drift of a vehicle is observed by changes in the positions of tracked zero-Doppler-speed hitbox targets in the hitbox over a time period (e.g., starting the time period once a stationary status is established by the algorithm [time=stationary] 252), and then, flags the case when tracked targets all drift in one direction with magnitude higher than a prescribed threshold (e.g., 20 cm) ("YES" branch of block 506) (508). In some embodiments, where the magnitude of drift is below a prescribed threshold, no flag is set and the vehicle is considered stationary ("NO" branch of block 506) (510). In some embodiments, a drift indication as to whether the vehicle is stationary or non-stationary by a noticeable drift is set (512).

Figure 5B:
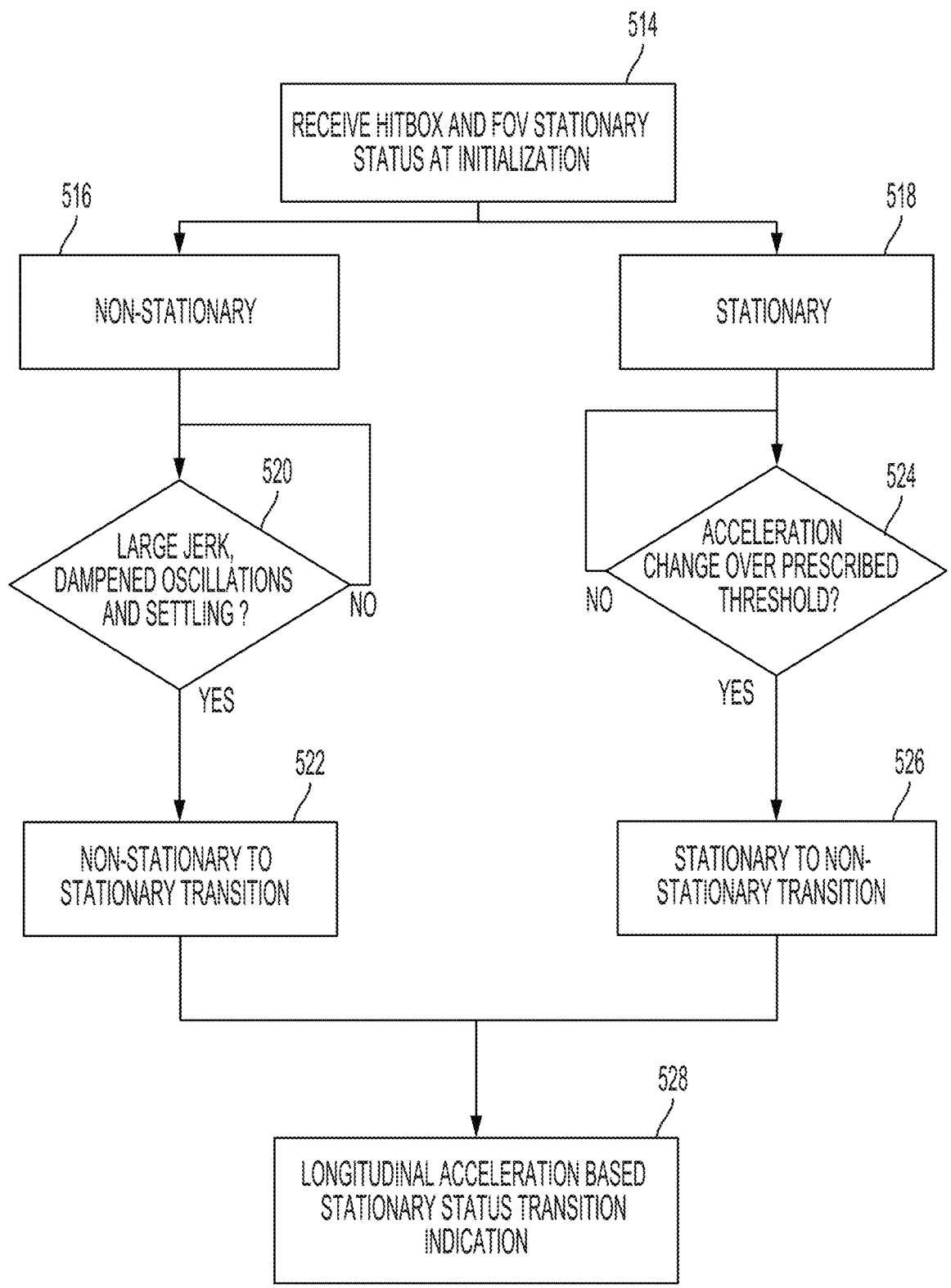
FIG. 5B is a high-level flow diagram of a longitudinal acceleration algorithm, in accordance with some embodiments.

FIG. 5B is a high-level flow diagram of a longitudinal acceleration algorithm, in accordance with some embodiments. In some embodiments, the longitudinal acceleration algorithm indicates transitions from stationary to non-stationary if the measured/filtered longitudinal acceleration of the vehicle changes above a prescribed limit. Additionally or alternatively, this limit is selected to account for the maximum allowed pitching of a stationary vehicle for all vehicle types, sensor noise, and environmental noise such as expected passenger vibrations.

In some embodiments, the longitudinal acceleration algorithm receives a stationary status from the hitbox processing algorithm and the FOV processing algorithm (514). When the received status is non-stationary (516) the longitudinal acceleration algorithm will iteratively determine, over a time period, if a large negative decrease in acceleration followed by underdamped oscillations and finally the acceleration settles within bound (e.g., indicative of the when a train stops) is detected by the one or more IMU ("NO" branch of block 520). In some embodiments, the one or more IMU detects transitions from non-stationary to stationary by detecting a large negative decrease in acceleration (e.g., indicating a vehicle stopping with a large jerk on the vehicle) in the longitudinal direction ("YES" branch of block 520). In some embodiments, a verification of the large negative decrease in acceleration is performed by sensing underdamped oscillations in the longitudinal acceleration of the vehicle followed by a bounded longitudinal acceleration. Additionally or alternatively, upon detecting the large negative decrease in acceleration, a stationary status is set (522).

In some embodiments, the vehicle behavior is to have a large jerk, followed by underdamped oscillations in the longitudinal acceleration, and finally a bounded longitudinal acceleration. Additionally or alternatively, this stopping behavior happens as the force applied to the vehicle suddenly drops when the vehicle comes to a complete stop, resulting in the big jerk (e.g., a large negative decrease in acceleration). This impulsive change in the force causes the energy to be stored in the suspension system and then dissipated causing the underdamped (decaying) oscillations in the longitudinal acceleration. Finally, when the energy is almost fully dissipated, the longitudinal acceleration will converge to a bounded, almost-constant value.

In some embodiments, detection is realized through rule-based checks on the magnitude and time periods of any detected consecutive oscillations in the longitudinal acceleration. Additionally or alternatively, templates identifying stopping behaviors in the longitudinal acceleration and then correlating the detected underdamped oscillations to the templates using standard correlation methods is one embodiment, e.g., Pearson's coefficient of correlation.

In some embodiments, the longitudinal acceleration algorithm receives an initial stationary status from the hitbox processing algorithm and the FOV processing algorithm (514). In some embodiments, when the received status is stationary (518), longitudinal acceleration algorithm will iteratively determine whether a change in the longitudinal acceleration of the vehicle is above a prescribed threshold to indicate a change in the vehicle status from stationary to non-stationary ("NO" branch of block 524). In some embodiments, when a change in longitudinal acceleration (e.g., data from one or more IMU) of the vehicle is detected above the prescribed threshold to indicate a change in the vehicle status from stationary to non-stationary, the stationary status is set to non-stationary (526). Additionally or alternatively, a longitudinal-acceleration-based stationary status (528) is set to non-stationary (526) or stationary (522) depending on the one or more IMU data. In some embodiments, the longitudinal-acceleration-based stationary status (528) will be used in other algorithms to determine a stationary status and a unified stationary status, as will be discussed in greater detail below.

Figure 5C:
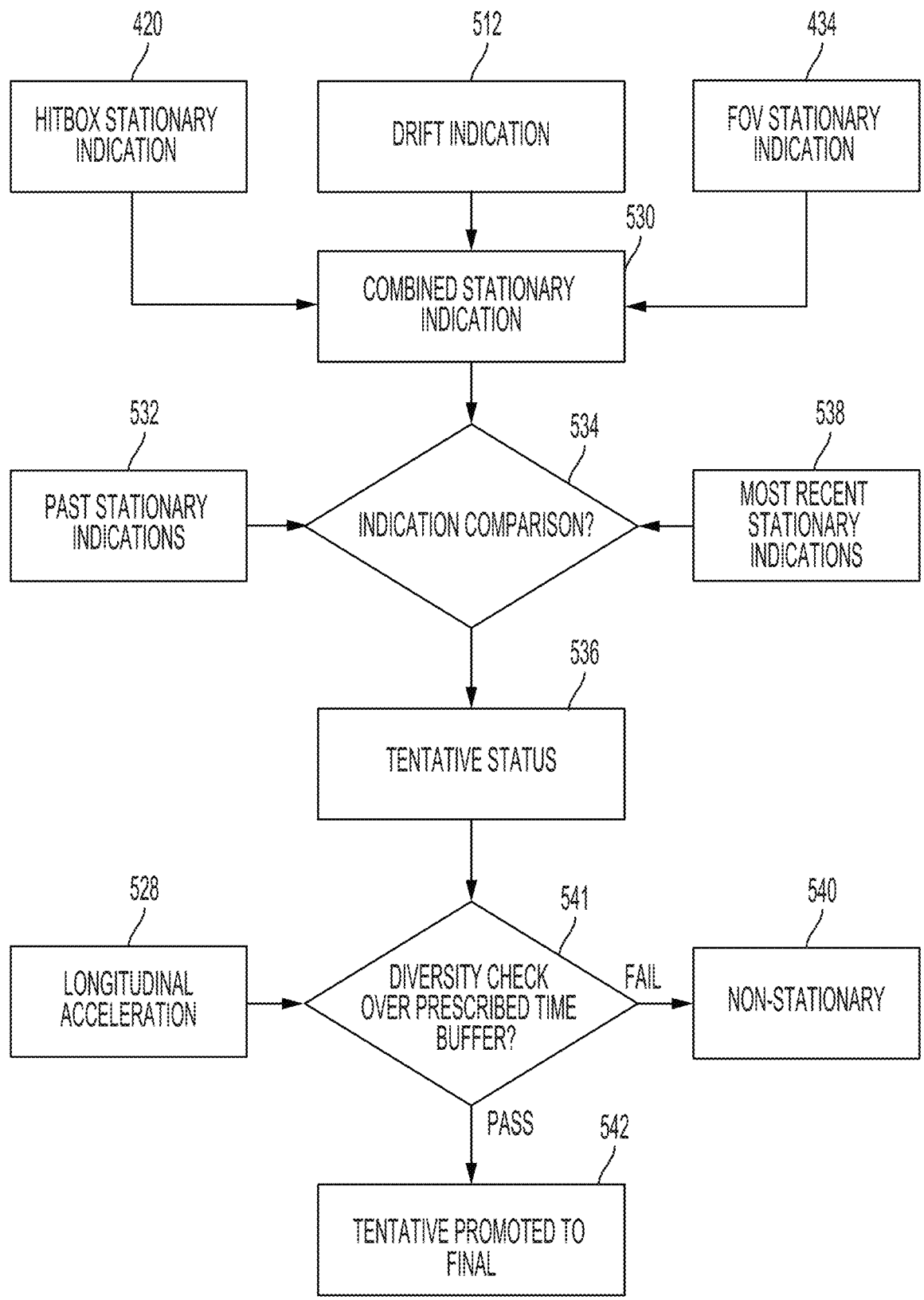
FIG. 5C is a high-level flow diagram of a combined stationary algorithm, in accordance with some embodiments.

FIG. 5C is a high-level flow diagram of a combined stationary algorithm, in accordance with some embodiments. In some embodiments, the one or more radar are the primary sensor technology for indicating a stationary status of the vehicle. Additionally or alternatively, the one or more IMU are utilized to determine state transition based on the motion profile measured. In some embodiments, the hitbox processing indication (420 FIG. 4A), the FOV processing indication (434 FIG. 4B), the drift indication (512 FIG. 5A) and the longitudinal acceleration indication (528 FIG. 5B) are combined and monitored over a persistency period in order to provide the final output, i.e., the stationary decision.

In some embodiments, the output indications of the hitbox stationary indication 420 and the FOV stationary indication are combined in various ways. In some embodiments, a decision maker (e.g., a machine learning classifier) considers information from each processing chain in combining their indications (530). For example, a decision maker simultaneously considers how many zero-Doppler-speed targets are detected in the FOV, their distribution, how many zero-Doppler-speed targets are tracked in the hitbox and their confidence levels provided by the radar tracking management function. Then, the decision maker outputs a unified stationary status indication based on the information received from both processing chains.

In order to increase the robustness against false indications, the stationary indication has to be consistently repeated over a prescribed persistency period to generate the final stationary decision. The final decision does not depend on an instantaneous stationary indication but on a series of stationary indications during a persistency period.

In some embodiments, the current combined stationary indication (530) and the last $N_{ind}$ stationary indications (532) are checked for changing the function decision from non-stationary to stationary. In some embodiments, when all the current (530) and the last $N_{ind}$ stationary indications (532) are stationary, then the tentative status is stationary (536). In some embodiments, the combined stationary indication (530) and the last $N'_{ind}$ stationary indications (e.g., most recent stationary indications 538), where $N'_{ind} < N_{ind}$, are checked for changing the function decision from stationary to non-stationary. In some embodiments, when the combined stationary indication (530) and the last $N'_{ind}$ stationary indications (538) are non-stationary, then the tentative decision (536) is non-stationary. Thus, when a stationary status is repeated over a period of time (e.g., from time=0 to time=$N'_{ind}$), this redundancy of status over time assists in defending against false flags. For example, one indication of a change in status is not good enough, but instead after ten, twenty or fifty changes in status, then the combined stationary indication algorithm will initiate a change of status. Otherwise, the last decision of the combined stationary indication algorithm is not changed.

In some embodiments, the longitudinal-acceleration-based stationary status change indication (528) is used as a check of the state transition determined from the tentative status decision (536). In some embodiments, When a state transition is indicated by either the hitbox processing algorithm, the FOV processing algorithm or the longitudinal acceleration algorithm, a timer is initiated and the same stationary status transition must be confirmed within a prescribed time buffer (541) (e.g., less than 1 second) for the diversity check to succeed. In some embodiments, when the check fails ("FAIL" branch of block 541), the final decision 540 will be "non-stationary" (e.g., the system fails to assuming the vehicle is moving for safety purposes as for safety purposes it is desired to avoid a stationary decision by mistake and creating a safety issue for passengers or cargo); otherwise, the tentative decision is promoted to be final ("PASS" branch of block 541) (542).

Figure 5D:
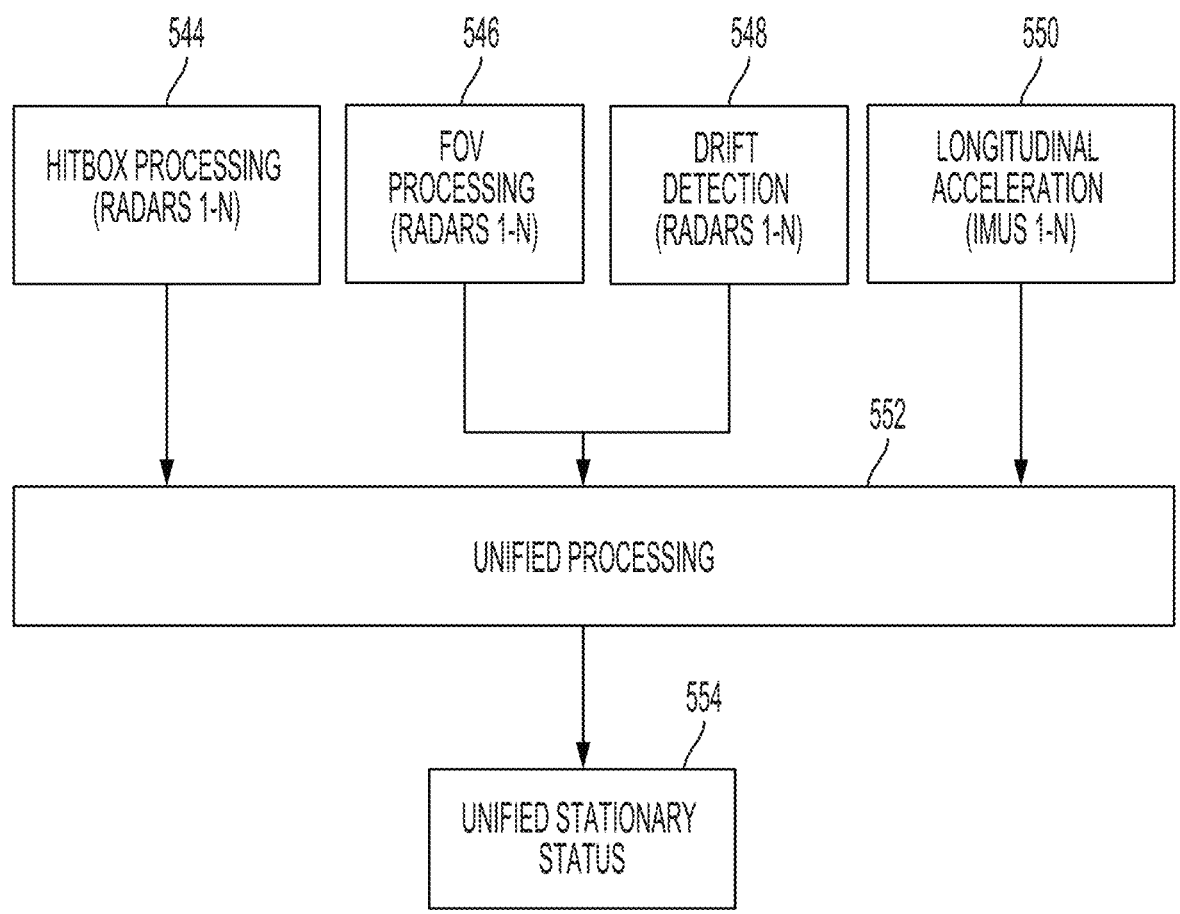
FIG. 5D is a high-level flow diagram of a unified stationary algorithm, in accordance with some embodiments.

FIG. 5D is a high-level flow diagram of a unified stationary algorithm, in accordance with some embodiments. In some embodiments, unified stationary algorithm combines the decisions of redundant devices (e.g., one or more radars (e.g., radars 1-N and one or more IMUs (e.g., IMUs 1-N)) for outputting a unified stationary status decision of the unified stationary algorithm. In some embodiments, combining the determined stationary status of the vehicle from multiple devices to output a unified stationary status decision for the vehicle provides another level of safety and redundancy to the SSRS.

In some embodiments, hitbox processing from each of one or more radars (544), FOV processing from each of one or more radars (546), drift detection from each of the one or more radars (548) and longitudinal acceleration from each of the one or more IMUs (550) is processed to provide a unified stationary status (552). In some embodiments, a decision maker (e.g., a machine learning classifier or artificial intelligence) considers information from each processing chain in combining their indications. In some embodiments, a decision maker simultaneously considers how many zero-Doppler-speed targets are detected in each FOV for each radar, their distribution, how many zero-Doppler-speed targets are tracked in each hitbox for each radar and their confidence levels provided by the tracking management function. Then, the unified decision maker (552) outputs a unified stationary status (554) indication based on the information received from all processing chains.

In some embodiments, neither the one or more radars nor the one or more IMUs are not mounted on the wheels of the vehicle, and consequently do not suffer from wheel slipping/spinning errors. Additionally or alternatively, the radars and the IMUs are installed on the train body to lower installation and maintenance costs. In some embodiments, the radars and IMUs are COTS equipment and thus inexpensive. Further, the COTS radar and IMUs are not sensitive to environmental conditions such as adverse weather and illumination effects. Finally, the radar and IMUs do not require installation of equipment along the entire track side.

In some embodiments, the stationary resolution algorithm does not rely on integrating acceleration to calculate speed or position, and hence the stationary resolution algorithm does not suffer from bias integration errors. Additionally, some of the embodiments are considerably more robust against environmental conditions such as weather and is not affected by illumination changes.

Figure 6:
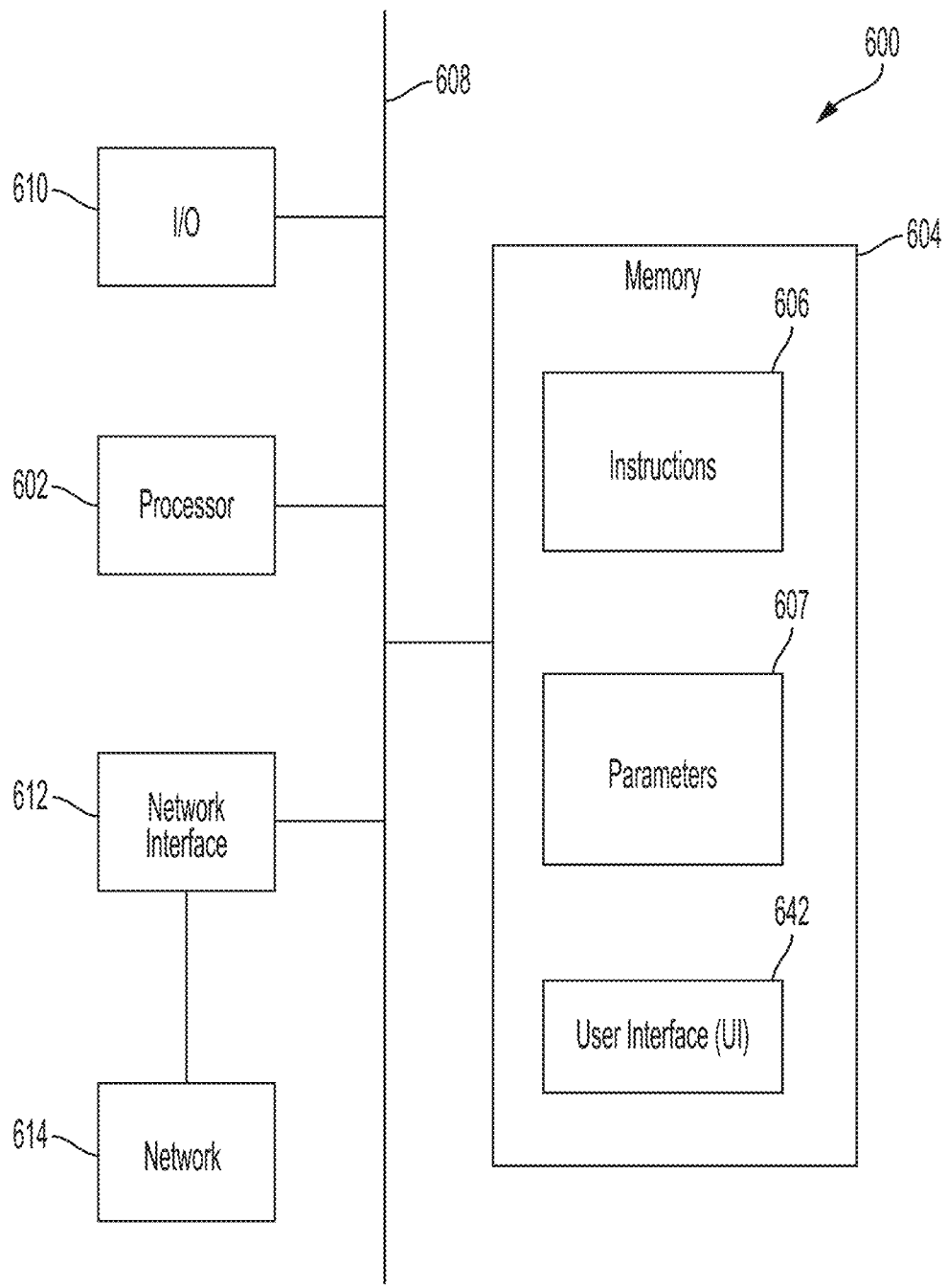
FIG. 6 is a high-level functional block diagram of a processor-based system, in accordance with some embodiments.

FIG. 6 is a high-level functional block diagram of a processor-based system, in accordance with some embodiments. In some embodiments, stationary resolution system processing circuitry 600 is a general purpose computing device including a hardware processor 602 and a non-transitory, computer-readable storage medium 604. Storage medium 604, amongst other things, is encoded with, i.e., stores, computer program instructions 606, i.e., a set of executable instructions such as stationary resolution algorithm. Execution of instructions 606 by hardware processor 602 represents (at least in part) a stationary vehicle resolution discovery tool which implements a portion or all of the methods described herein in accordance with one or more embodiments (hereinafter, the noted processes and/or methods).

Processor 602 is electrically coupled to a computer-readable storage medium 604 via a bus 608. Processor 602 is also electrically coupled to an I/O interface 610 by bus 608. A network interface 612 is also electrically connected to processor 602 via bus 608. Network interface 612 is connected to a network 614, so that processor 602 and computer-readable storage medium 604 are capable of connecting to external elements via network 614. Processor 602 is configured to execute computer program instructions 606 encoded in computer-readable storage medium 604 in order to cause stationary resolution system processing circuitry 600 to be usable for performing a portion or all of the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, storage medium 604 stores computer program instructions 606 configured to cause stationary resolution system processing circuitry 600 to be usable for performing a portion or all of the noted processes and/or methods. In one or more embodiments, storage medium 604 also stores information, such as stationary resolution algorithm which facilitates performing a portion or all of the noted processes and/or methods. In one or more embodiments, storage medium 604 stores parameters 607.

Stationary resolution system processing circuitry 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Stationary resolution system processing circuitry 600 also includes network interface 612 coupled to processor 602. Network interface 612 allows stationary resolution system processing circuitry 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more stationary resolution system processing circuitries 600.

Stationary resolution system processing circuitry 600 is configured to receive information through I/O interface 610. The information received through I/O interface 610 includes one or more of instructions, data, design rules, and/or other parameters for processing by processor 602. The information is transferred to processor 602 via bus 608. Stationary resolution system processing circuitry 600 is configured to receive information related to a UI through I/O interface 610. The information is stored in computer-readable medium 604 as user interface (UI) 642.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

A system of one or more computers are configured to perform particular operations or actions by virtue of having software, firmware, hardware, or a combination of them installed on the system that in operation causes or cause the system to perform the actions. One or more computer programs are configured to perform particular operations or actions by virtue of including instructions that, when executed by data processing apparatus, cause the apparatus to perform the actions. One general aspect includes filtering radar targets detected by one or more radars operably coupled to a body of a vehicle, based on a range and an azimuth angle, to select the radar targets within a hitbox that is a predetermined area in front of the vehicle. The method also includes filtering the selected radar targets within the hitbox to select from the selected radar targets with a substantially zero-Doppler-speed. The method also includes tracking the substantially zero-Doppler-speed radar targets to verify positions of the substantially zero-Doppler-speed radar targets are constant. The method also includes determining a number and distribution of the substantially zero-Doppler-speed radar targets to determine a stationary status. The method also includes determining whether the substantially zero-Doppler-speed radar targets are moving in synchronization to determine a vehicle's first stationary status. Other embodiments of this aspect include corresponding computer systems, apparatus, and computer programs recorded on one or more computer storage devices, each configured to perform the actions of the methods.

In some embodiments, implementations include one or more of the following features. The method includes: filtering field of view (FOV) radar targets that are outside of the hitbox, detected by the one or more radars, based on the substantially zero-Doppler-speed; determining a number and distribution of the filtered FOV radar targets to determine a stationary status; determining whether the number of the filtered FOV radar targets are greater than or equal to a predetermined number; and determining whether the filtered FOV radar targets are synchronized in detected movement to determine a vehicle's second stationary status. The method includes determining the vehicle's first stationary status and the vehicle's second stationary status for each of the one or more radars. The method includes cross-comparing each of the one or more vehicles' first stationary status and each of the one or more vehicles' second stationary status to detect potential failures in the one or more radars. The method includes detecting, at speeds lower than a numerical speed resolution of the one or more radars, drift of the vehicle by detecting changes in positions of the hitbox radar targets or the filtered FOV radar targets over a period of time. The method includes identifying the substantially zero-Doppler-speed radar targets of the hitbox or the filtered FOV radar targets where the drift is equal to or greater than a predetermined threshold. The method includes identifying, based on data from one or more inertial measurement units (IMU), whether longitudinal acceleration is detected indicating a transition from a stationary status. The method includes determining, based on the vehicle's first stationary status and the vehicle's second stationary status, a unified stationary status indication. The unified stationary status indication is also based on whether there is detected drift of the vehicle. The method includes changing the unified stationary status indication based on a plurality of consecutive status indications from the first stationary status, the second stationary status or the detected vehicle drift indicating a status change over a predetermined time period before. Implementations of the described techniques include hardware, a method or process, or computer software on a computer-accessible medium.

In some embodiments, a non-transitory computer-readable storage medium includes instructions to identify, based upon Doppler-speed determination from one or more radars, radar targets within a hitbox for determining a first stationary status of a vehicle based on tracking Doppler-speed radar targets in a hitbox region. The medium also includes instructions to identify, based upon the Doppler speed determination from the one or more radars, field-of-view (FOV) radar targets for determining a second stationary status based on a substantial number and a distribution of Doppler-speed determinations for the FOV radar targets. The medium also includes instructions to confirm, based on detecting a change in either of the first or the second stationary status of the vehicle, an acceleration sensed by an inertial measurement unit onboard the vehicle. Other embodiments of this aspect include corresponding computer systems, apparatus, and computer programs recorded on one or more computer storage devices, each configured to perform the actions of the methods.

In some embodiments, implementations include one or more of the following features. The non-transitory computer-readable storage medium where the instructions further includes instructions that, when executed by the processor, cause the processor to determine, based upon speeds lower than a numerical speed resolution of the one or more radar, drift of the vehicle based upon a plurality of stationary statuses compared against one another over time. The instructions further includes instructions that, when executed by the processor, cause the processor to verify, based on changes in the first or the second stationary status of the vehicle, a change in longitudinal acceleration of the vehicle detected by an inertial measurement unit (IMU). The instructions further includes instructions that, when executed by the processor, cause the processor to determine, based on the first stationary status, the second stationary status, and the longitudinal acceleration of the IMU, a third stationary status of the vehicle. Implementations of the described techniques include hardware, a method or process, or computer software on a computer-accessible medium.

In some embodiments, a stationary resolution system (SSRS) includes a vehicle for use on a guideway. The system also includes one or more radars operably coupled to a body of the vehicle. The system also includes one or more processors operably coupled to the one or more radars. The system also includes memory operably coupled to the one or more processors, the memory configured to store executable instructions that when executed by the one or more processors, causes the one or more processors to: determine a plurality of hitbox targets located within a predetermined area in front of the vehicle that have a constant range based upon returned radar signals, determine a plurality of field of view (FOV) targets that have a constant range based upon the returned radar signals, and determine the vehicle is stationary when a plurality of hitbox targets and a plurality of FOV targets have the constant range based upon the returned radar signals. Other embodiments of this aspect include corresponding computer systems, apparatus, and computer programs recorded on one or more computer storage devices, each configured to perform the actions of the methods.

In some embodiments, implementations include one or more of the following features. The system where the instructions further includes instructions that, when executed by the processor, cause the processor to determine a first stationary status of the vehicle based upon zero-Doppler-speed determination from the plurality of hitbox targets. The instructions further includes instructions that, when executed by the processor, cause the processor to determine, based upon a zero-Doppler-speed determination from the plurality of FOV targets, a second stationary status based on a substantial number and a distribution of zero-Doppler-speed determinations for the plurality of FOV targets. The system includes one or more inertial measurement units (IMU) operably coupled to a center point of the vehicle body. The instructions further includes instructions that, when executed by the processor, cause the processor to confirm, based on the processor detecting a change in either of the first or the second stationary status of the vehicle, an acceleration sensed by the one or more IMUs. Implementations of the described techniques include hardware, a method or process, or computer software on a computer-accessible medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
 filtering hitbox radar targets from field of view (FOV) radar targets, the FOV radar targets detected by one or more radars operably coupled to a body of a vehicle, the hitbox radar targets filtered based on a range and an azimuth angle, the hitbox radar targets being within a a predetermined area in front of the vehicle;
 filtering the hitbox radar targets to select substantially zero-Doppler-speed hitbox radar targets;
 tracking the substantially zero-Doppler-speed hitbox radar targets to verify whether positions of the substantially zero-Doppler-speed hitbox radar targets are constant;
 determining a number and distribution of the substantially zero-Doppler-speed hitbox radar targets; and
 determining a vehicle first stationary status based on whether the number of substantially zero-Doppler-speed hitbox radar targets are moving in synchronization.

2. The method of claim h further comprising:
 determining substantially zero-Doppler-speed FOV radar targets outside of a hitbox;
 determining a number and distribution of substantially zero-Doppler-speed filtered FOV radar targets;
 determining whether the number of the substantially zero-Doppler-speed FOV radar targets outside of the hitbox are greater than or equal to a predetermined number; and
 determining whether the substantially zero-Doppler-speed FOV radar targets outside of the hitbox are synchronized in detected movement to determine a vehicle second stationary status.

3. The method of claim 2, further comprising:
 determining the vehicle first stationary status and the vehicle second stationary status for each radar of the one or more radars.

4. The method of claim 3, further comprising:
 cross-comparing each radar vehicle first stationary status and each vehicle second stationary status to detect potential failures in the one or more radars.

5. The method of claim 2, further comprising:
 detecting drift of the vehicle at speeds lower than a numerical speed resolution of the one or more radars by detecting changes in position of the hitbox radar targets or the FOV radar targets over a period of time.

6. The method of claim further comprising:
 identifying the substantially zero-Doppler-speed hitbox radar targets or the substantially zero-Doppler-speed FOV radar targets outside of the hitbox where the drift is equal to or greater than a predetermined threshold.

7. The method of claim k further comprising:
 identifying whether longitudinal acceleration is detected indicating a transition from a stationary status, based on data from one or more inertial measurement units (IMU).

8. The method of claim 5, further comprising:
 determining a unified stationary status indication, based on the vehicle first stationary status and the vehicle second stationary status.

9. The method of claim 8, wherein the unified stationary status indication is determined further based on a detected drift of the vehicle.

10. The method of claim 9, further comprising:
 changing the unified stationary status indication based on a plurality of consecutive status indications from the vehicle first stationary status, the vehicle second stationary status or the detected drift of the vehicle indicating a status change over a predetermined time period.

11. A stationary status resolution system (SSRS) comprising:
 a vehicle for use on a guideway;
 one or more radars operably coupled to a body of the vehicle;
 one or more processors operably coupled to the one or more radars; and
 memory operably coupled to the one or more processors, the memory configured to store executable instructions that when executed by the one or more processors, cause the one or more processors to:
  determine a plurality of hitbox targets located within a predetermined area in front of the vehicle that have a constant range based upon returned radar signals;
  determine a plurality of field of view (FOV) targets that have a zero-Doppler-speed based upon the returned radar signals;
  select hitbox radar targets having a substantially zero-Doppler-speed;
  track the selected substantially zero-Doppler-speed hitbox radar targets;
  determine whether positions of the substantially zero-Doppler-speed hitbox radar targets are substantially constant;
  determine substantially zero-Doppler-speed FOV radar targets outside of a hitbox; and
  determine a hitbox-based stationary status and a FOV-based stationary status based upon the returned radar signals.

12. The system of claim 11, wherein the instructions further comprise instructions that, when executed by the processor, cause the processor to determine a first stationary status of the vehicle based upon zero-Doppler-speed determination and constant range evaluation from the plurality of hitbox targets.

13. The system of claim 12, wherein the instructions further comprise instructions that, when executed by the processor, cause the processor to determine a second stationary status of the vehicle based on a substantial number and a distribution of zero-Doppler-speed determinations for the plurality of FOV targets.

14. The system of claim 13, further comprising one or more inertial measurement units (IMU) operably coupled to a center point of the vehicle body.

15. The system of claim 14, wherein the instructions further comprise instructions that, when executed by the processor, cause the processor to confirm, through a diverse sensor technology, a change in either of the first or second stationary status of the vehicle.

16. The system of claim 13, wherein the instructions further comprise instructions that, when executed by the processor, cause the processor to record the first stationary status and the second stationary status over a period of time.

17. A method comprising:
 filtering radar targets detected by one or more radars operably coupled to a body of a vehicle based on a range and an azimuth angle;
 filtering hitbox radar targets within a hitbox in front of the vehicle from field of view (FOV) radar targets;
 filtering the hitbox radar targets that have substantially zero-Doppler-speed;
 tracking the substantially zero-Doppler-speed hitbox radar targets to determine whether positions of the substantially zero-Doppler-speed hitbox radar targets are substantially constant;
 determining whether the substantially zero-Doppler-speed hitbox radar targets are moving in synchronization to determine a vehicle first stationary status;
 filtering FOV radar targets that are outside of the hitbox, detected by the one or more radars, based on the substantially zero-Doppler-speed;
 determining a number and distribution of the filtered FOV radar targets to determine a stationary status;
 determining whether the number of the filtered FOV radar targets are greater than or equal to a predetermined number; and
 determining whether the filtered FOV radar targets are synchronized in detected movement to determine a vehicle second stationary status.

18. The method of claim 17, further comprising determining the vehicle first stationary status and the vehicle second stationary status for each radar of the one or more radars.

19. The method of claim 18, further comprising cross-comparing each first and second stationary status to detect potential failures in each radar of the one or more radars.

20. The method of claim 17, further comprising detecting, at speeds lower than a numerical speed resolution of the one or more radars, drift of the vehicle by detecting changes in positions of the hitbox radar targets or the filtered FOV radar targets over a period of time.

* * * * *